US010720069B2

(12) United States Patent
Rutkiewicz et al.

(10) Patent No.: US 10,720,069 B2
(45) Date of Patent: Jul. 21, 2020

(54) METHOD AND SYSTEM FOR AIRCRAFT TAXI STRIKE ALERTING

(71) Applicant: Rosemount Aerospace Inc., Burnsville, MN (US)

(72) Inventors: Robert Rutkiewicz, Edina, MN (US); Joseph T. Pesik, Eagan, MN (US); Todd Anthony Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 315 days.

(21) Appl. No.: 15/489,381

(22) Filed: Apr. 17, 2017

(65) Prior Publication Data

US 2018/0301043 A1    Oct. 18, 2018

(51) Int. Cl.
*G08G 5/04* (2006.01)
*G08G 5/00* (2006.01)
(Continued)

(52) U.S. Cl.
CPC ............... *G08G 5/04* (2013.01); *B64D 45/00* (2013.01); *B64D 47/08* (2013.01); *B64F 1/002* (2013.01); *G01B 11/25* (2013.01); *G01S 17/04* (2020.01); *G01S 17/48* (2013.01); *G01S 17/89* (2013.01); *G01S 17/931* (2020.01); *G06K 9/00805* (2013.01); *G06K 9/2027* (2013.01);
(Continued)

(58) Field of Classification Search
None
See application file for complete search history.

(56) References Cited

U.S. PATENT DOCUMENTS 6,118,401 A    9/2000  Tognazzini
6,405,975 B1   6/2002  Sankrithi et al.
(Continued)

FOREIGN PATENT DOCUMENTS

CA    2464791 A1   10/2004
CA    2737189 A1   10/2011
(Continued)

OTHER PUBLICATIONS

Extended European Search Report for EP Application No. 18167332.8, dated Jul. 20, 2018, 9 pages.
(Continued)

*Primary Examiner* — Lindsay J Uhl
(74) *Attorney, Agent, or Firm* — Kinney & Lange, P.A.

(57) ABSTRACT

Apparatus and associated methods relate to ranging object(s) nearby an aircraft using triangulation of pulses of linearly-patterned light projected upon and reflected by the object(s). A light projector projects the pulses of linearly-patterned light in a controllable direction onto the scene external to the aircraft. A reflected portion of the projected pulses is focused onto a selected row or column of light-sensitive pixels of a two-dimensional array, thereby forming a row or column of image data. The direction of projected light and the row or column of pixels selected are coordinated so that the portion of the projected pulses reflected by the scene is received by the camera and focused on the selected one of the rows or columns of light-sensitive pixels. Location(s) and/or range (s) of object(s) in the scene are calculated, based on a projector location, a camera location, and the row or column of image data.

20 Claims, 7 Drawing Sheets

(51) Int. Cl.

| | | |
|---|---|---|
| *G06T 7/521* | (2017.01) | |
| *H04N 5/33* | (2006.01) | |
| *H04N 5/225* | (2006.01) | |
| *G01S 17/48* | (2006.01) | |
| *B64D 47/08* | (2006.01) | |
| *B64D 45/00* | (2006.01) | |
| *G01S 17/89* | (2020.01) | |
| *G06K 9/20* | (2006.01) | |
| *G06K 9/00* | (2006.01) | |
| *G01B 11/25* | (2006.01) | |
| *G08G 5/06* | (2006.01) | |
| *B64F 1/00* | (2006.01) | |
| *G01S 17/04* | (2020.01) | |
| *G01S 17/931* | (2020.01) | |
| *B64D 47/02* | (2006.01) | |

(52) U.S. Cl.
CPC ............ *G06K 9/2036* (2013.01); *G06T 7/521* (2017.01); *G08G 5/0021* (2013.01); *G08G 5/0073* (2013.01); *G08G 5/045* (2013.01); *G08G 5/065* (2013.01); *H04N 5/2256* (2013.01); *H04N 5/33* (2013.01); *B64D 47/02* (2013.01); *G06K 2209/401* (2013.01); *G06T 2207/10016* (2013.01); *G06T 2207/10028* (2013.01); *G06T 2207/30261* (2013.01)

(56) References Cited

U.S. PATENT DOCUMENTS

| | | | |
|---|---|---|---|
| 6,571,166 B1 | 5/2003 | Johnson et al. | |
| 6,754,370 B1* | 6/2004 | Hall-Holt | G01B 11/25 356/3 |
| 7,592,929 B2 | 9/2009 | Pepitone | |
| 7,974,773 B1 | 7/2011 | Krenz et al. | |
| 8,237,835 B1 | 8/2012 | Muller | |
| 9,047,771 B1 | 6/2015 | Thoreen et al. | |
| 9,174,746 B1 | 11/2015 | Bell et al. | |
| 9,245,450 B1 | 1/2016 | Chiew et al. | |
| 9,401,094 B2 | 7/2016 | Cros et al. | |
| 9,472,109 B2* | 10/2016 | Starr | G06F 3/0484 |
| 2007/0241936 A1 | 10/2007 | Arthur et al. | |
| 2010/0094487 A1 | 4/2010 | Brinkman | |
| 2010/0110280 A1* | 5/2010 | Aoyama | G01S 7/023 348/364 |
| 2014/0092206 A1 | 4/2014 | Boucourt et al. | |
| 2015/0142214 A1 | 5/2015 | Cox et al. | |
| 2015/0222801 A1 | 8/2015 | Kresser | |
| 2015/0310663 A1* | 10/2015 | Yamasaki | H04N 9/31 348/136 |
| 2015/0341619 A1 | 11/2015 | Meir et al. | |
| 2016/0006914 A1 | 1/2016 | Neumann | |
| 2016/0182889 A1 | 6/2016 | Olmstead | |
| 2016/0205378 A1* | 7/2016 | Nevet | H04N 13/254 348/47 |
| 2017/0067734 A1* | 3/2017 | Heidemann | G01B 11/2545 |
| 2017/0176575 A1* | 6/2017 | Smits | G01S 17/10 |
| 2017/0301250 A1 | 10/2017 | Ell et al. | |
| 2017/0334578 A1 | 11/2017 | Fleck et al. | |

FOREIGN PATENT DOCUMENTS

| | | |
|---|---|---|
| CN | 105391975 A | 3/2016 |
| EP | 0980828 A1 | 2/2000 |
| EP | 1842772 A2 | 10/2007 |
| EP | 1927965 A2 | 6/2008 |
| EP | 2426461 A2 | 3/2012 |
| EP | 2495168 A1 | 9/2012 |
| EP | 2565861 A2 | 3/2013 |
| EP | 2685442 A2 | 1/2014 |
| EP | 2892040 A1 | 7/2015 |
| EP | 3235735 A1 | 10/2017 |
| WO | 2009010969 A2 | 1/2009 |
| WO | WO2013/063392 A1 | 5/2013 |
| WO | WO2015/157410 A1 | 10/2015 |
| WO | 2016008513 A1 | 1/2016 |

OTHER PUBLICATIONS

International Civil Aviation Organization, "Aerodrome Standards: Aerodrome Design and Operations", ICAO: Cooperative Development of Operational Safety and Continuing Airworthiness, dated Jul. 1999, 194 pages.

International Civil Aviation Organization, "Airport Markings: ICAO & U.S. Requirements", ICAO: Federal Aviation Administration, dated Jun. 2012, 19 pages.

U.S. Department of Transporation, "Advisory Circular", U.S. DOT: Federal Aviation Administration, dated Sep. 27, 2013, 144 pages.

Xu, Lun Hui et al., "A New Lane Department Warning Algorithm Considering the Driver's Behavior Characteristics", Hindawi Publishing Corporation: Mathematical Problems in Engineering, dated Jul. 26, 2015, 12 pages.

Federal Aviation Administration, "A Quick Reference to Airfield Standards", FAA: Southern Region Airports Division, dated Jan. 2018, 69 pages.

* cited by examiner

METHOD AND SYSTEM FOR AIRCRAFT TAXI STRIKE ALERTING

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircrafts often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin and are thus positioned behind and out of the field of view of the cabin. Some commercial and some military planes have engines that hang below the wings of the aircraft. Pilots, positioned in the cabin, can have difficulty knowing the risk of collisions between the wingtips and/or engines and other objects external to the aircraft. An aircraft on-ground collision alerting system would be useful to survey the area forward or aft of the tail, wingtips and/or engines, to detect obstructions in a potential collision path, and to provide visual and audible alerts to the cockpit.

SUMMARY

Apparatus and associated methods relate to calculating location(s) and/or range(s) of object(s) in a scene external to an aircraft. An exemplary taxi strike alerting system includes a light projector, a camera, a controller and an image processor. The light projector is configured to be mounted at a projector location on the aircraft and to project pulses of linearly-patterned light in a controllable direction onto the scene external to the aircraft. The camera has a two dimensional array of light-sensitive pixels arranged in rows and columns. The camera is configured to be mounted at a camera location on the aircraft and to selectively capture a row or column of image data from a selected one of the rows or columns of light-sensitive pixels. The controller is configured to coordinate the light projector and the camera. Such coordination is performed by controlling the controllable direction of the projected pulses of linearly-patterned light so that a portion of the projected pulses of linearly-patterned light reflected by the scene external to the aircraft is received by the camera and focused on the selected one of the rows or columns of light-sensitive pixels. The image processor is configured to calculate, based on the projector location, the camera location, and the selectively captured row or column of image data, locations(s) and/or range(s) of object(s) in the scene from which the linearly-patterned light projected by the light projector is reflected.

Some embodiments relate to a method for calculating location(s) and/or range(s) of object(s) in a scene external to an aircraft. The method includes projecting, from a light projector configured to be mounted at a projector location on the aircraft, pulses of linearly-patterned light in a controllable direction onto the scene external to the aircraft. Then, a row or column of image data from a selected one of the rows or columns of light-sensitive pixels is selectively captured, by a camera having a two dimensional array of light-sensitive pixels arranged in rows and columns of light-sensitive pixels. The camera is configured to be mounted at a camera location on the aircraft. Then a direction of the projected pulses of linearly-patterned light is controlled so that a portion of the projected pulses of linearly-patterned light reflected by the scene external to aircraft is received by the camera and focused on the selected one of the rows or columns of light-sensitive pixels. Then, locations(s) and/or range(s) of object(s) in the scene from which the linearly-patterned light projected by the light projector is reflected are calculated. The location(s) and/or range(s) are calculated, based on the projector location, the camera location, and the selectively captured row or column of image data. Then, an alert signal is generated if the calculated location(s) and/or range(s) of object(s) indicate one or more of the object(s) in the scene has a combination of a location(s) and/or range(s) relative to the aircraft corresponding to a risk of collision.

DETAILED DESCRIPTION

Apparatus and associated methods relate to ranging object(s) nearby an aircraft using triangulation of pulses of linearly-patterned light projected upon and reflected by the object(s). A light projector projects the pulses of linearly-patterned light in a controllable direction onto the scene external to the aircraft. A reflected portion of the projected pulses is focused onto a selected row or column of light-sensitive pixels of a two-dimensional array, thereby forming a row or column of image data. The direction of projected light and the row or column of pixels selected are coordinated so that the portion of the projected pulses reflected by the scene is received by the camera and focused on the selected one of the rows or columns of light-sensitive pixels. Location(s) and/or range(s) of object(s) in the scene are calculated, based on a projector location, a camera location, and the row or column of image data.

In some embodiments the camera is operated using a rolling-mode shutter, in which a single row or column is exposed for a time period. Then another single row or column is exposed for another time period. The projection of pulses of linearly-patterned light can be synchronized with the exposure of a corresponding row or column of light-sensitive pixels using such a rolling-mode shutter. The pulse of linearly-patterned light is projected upon the scene in a direction that results in reflections from the scene that are focused upon the row or column being exposed. Exposing only the row or column upon which the projected pulse of linearly-patterned light is focused minimizes the power consumption, by minimizing the number of pixels requiring processing and by minimizing the projector energy required for a specified signal-to-noise ratio.

A two-dimensional image can be created by abutting a sequence of row or column images. A two-dimensional standard-contrast image in which light is integrated over an exposure time can be generated. Such a standard-contrast image can be used in conjunction with the sequence of row or column images that capture the reflected pulses of linearly-patterned light. The standard-contrast images can be displayed on a cockpit display device and annotated with location(s) and/or range(s) of objects external to the aircraft as calculated by the row or column image data. Standard images can be used in conjunction with the images to identify pixel boundaries of the object and to calculate range values of portions of the object corresponding to pixels imaging the linearly-patterned light projected onto the scene.

In some embodiments, rows or columns of image data are captured both with and without pulsed illumination by the linearly-patterned light. A difference between these two images can be used to help isolate the reflections of the linearly-patterned light, by removing persistent sources of light (e.g., a flashing beacon). For pixels imaging reflections of the linearly-patterned light, triangulation can be used to calculate range. For pixels not imaging reflections of the linearly-patterned light, range can be calculated using one or more calculated ranges corresponding to nearby pixels imaging the linearly-patterned light reflected from the object. Using these two ranging techniques provides pixel level resolution of trajectory and/or range data, while requiring only sparse illumination of objects by linearly-patterned light.

Figure 1:
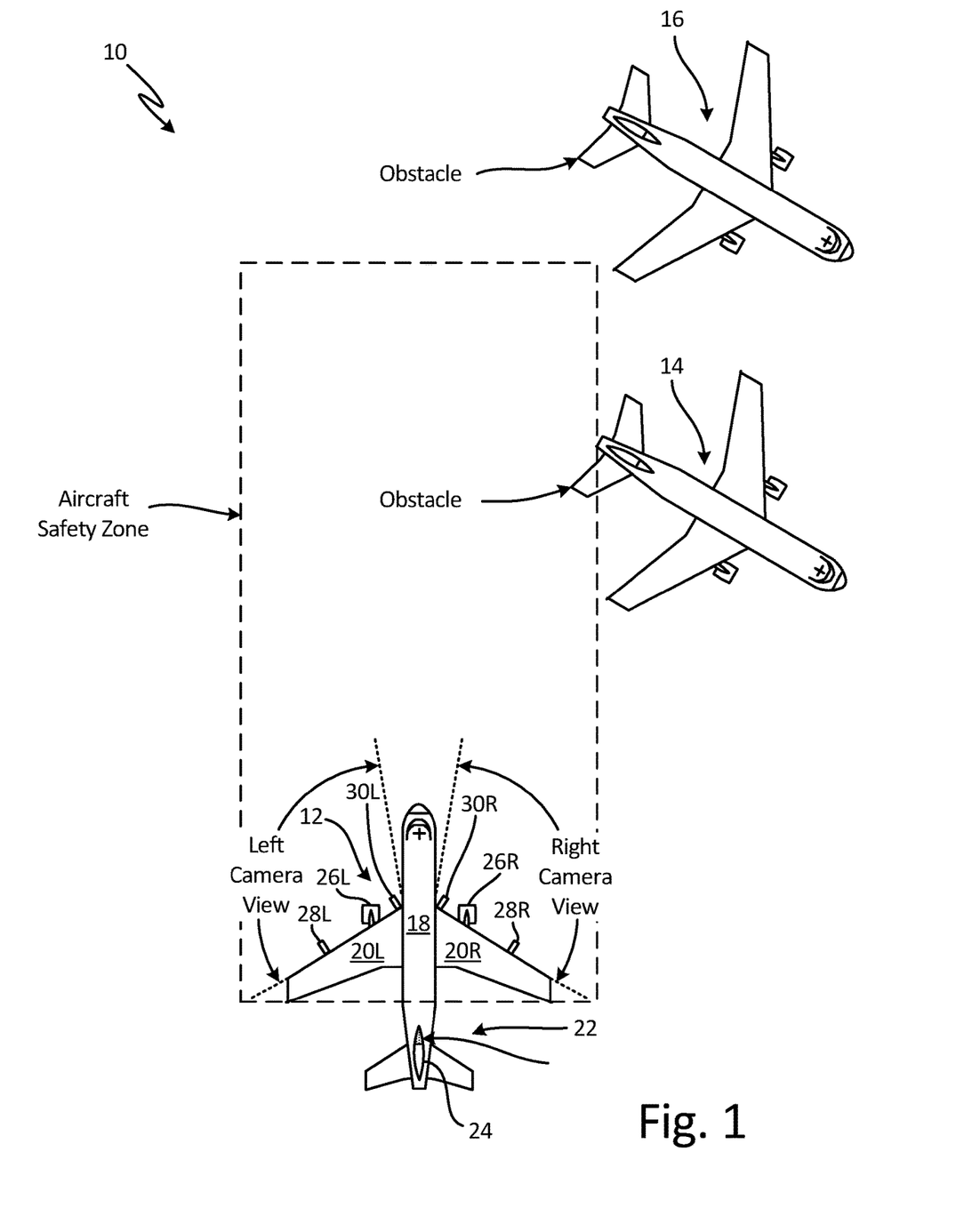
FIG. 1 is a schematic view of an exemplary aircraft collision alerting system used by an aircraft during on-ground operations.

FIG. 1 is a schematic view of an exemplary aircraft collision alerting system used by a taxiing aircraft. In FIG. 1, aircraft taxi scenario 10 includes taxiing aircraft 12 and two parked aircraft 14, 16. Taxiing aircraft 12 has cabin 18, wings 20L and 20R, and tail 22. Tail 22 has vertical stabilizer 24. Engine 26L and 26R hang from wings 20L and 20R. Taxiing aircraft 12 is equipped with an aircraft collision alerting system. The aircraft collision alerting system includes light projectors 28L and 28R and cameras 30L and 30R. In the depicted embodiment, light projector 28L and camera 30L are both mounted on wing 20L. Light projector 28R and camera 30R are both mounted on wing 20R. Light projectors 28L and 28R are configured to project pulses of linearly-patterned light onto a scene external to taxiing aircraft 12, thereby providing illumination of a linearly-patterned portion of the scene. The scene may include objects nearby and external to taxiing aircraft 12. Light projectors 28L and 28R can be mounted at other locations on taxiing aircraft 12 in other embodiments.

An exemplary embodiment includes locating both projector and camera on each side of the cabin of an aircraft. Such a configuration can advantageously reduce the magnitude of external differential motion to which the system is exposed as compared to wing mounted configurations. In some embodiments, however, wing mounted cameras can provide good imagery related to potential hazards for wing and/or collisions.

Light projectors 28L and 28R project the pulses of linearly-patterned light in controllable directions of illumination. The projected pulses of linearly-patterned light illuminate objects that reside in that controllable direction of illumination. In the depicted embodiment, light projector 28L is aligned with camera 30L. In some embodiments an optical axis of camera 30L is parallel with a nominal direction of illumination for light projector 28L. In some embodiments, the optical axis of camera 30L and the nominal direction of illumination of light projector 28L are both perpendicular to an axis intersecting each of camera 30L and light projector 28L. In some embodiments the axis intersecting each of camera 30L and light projector 28L defines an axis of rotation about which the light projector can rotationally control a direction of the projected linearly-patterned light. Light projector 28R and camera 30R are similarly aligned to one another. In some embodiments, each of light projectors 28L and 28R is located on a line that includes a row or column of light-sensitive pixels in a focal plane array of each of cameras 30L and 30R, respectively. In this configuration, the projected pulses of linearly-patterned light are contained in planes that intercept both light projector 28L or 28R and camera 30L or 30R, respectively. Such a configuration permits coordination of a direction of illumination with an exposure of a row or column of light-sensitive pixels.

Light projectors 28L and 28R are shown illuminating objects that are within an azimuthal range of +/−40 degrees, for example, of the nominal projection direction, and within a controllable directed elevation range of a projection horizon of light projectors 28L and 28R. The elevation range of projection, for example, can be from about +3, +5, +10, +12, or +15 degrees to about −2, −5, −8, or −10 degrees of projection from a vertical location of light projectors 28L and 28R. Such a configuration facilitates detection of objects throughout most of the directions forward taxiing aircraft 12.

In some embodiments, the projected pulses of linearly-patterned light can intermittently illuminate objects in the controllable directions of illumination. Such illumination may use light of various wavelengths. For example, in some embodiments, infrared light, being invisible to humans, can be used to provide illumination of objects within the solid angle of illumination. Infrared light can advantageously be non-distractive to pilots and to other people upon whom the pulses of linearly-patterned light are projected. In some embodiments, a temporal change in the intensity of the illuminating pulses is controllable. Such temporal changes in the intensity of illuminating pulses can be controlled, for example, by controlling a rise time and/or a peak power of the illuminating pulses.

In some embodiments, the linearly-patterned light can be pulsed for a limited time, with image capture synchronized with the projector illumination. In some embodiments, cameras 30L and 38R are synchronized with light projectors 28L and 28R, respectively. In some embodiments, the linearly patterned light can be encoded as a sequence of dashes. In some embodiments, a sequence of projected pulses can be sequentially coded in various dashed-line patterns. Such encoding can facilitate the calculation of location(s) and/or range(s) of object(s) reflecting the pulses of linearly-patterned light thus encoded, as will be described below.

In some embodiments, camera 30L and 30R are also configured with a normal mode in which standard-contrast images are generated. Standard-contrast images are indicative of a measure of integrated light intensity over an exposure time. Each pixel of a focal plane array may generate a word of data indicative of the light intensity integrated over the exposure time. In some embodiments, the word depth can be eight, sixteen, twenty-four, or thirty-two bits, or other numbers of bits. The larger word depths are capable of providing data indicative of finer resolutions than the smaller word depths. The standard-contrast images can be used in conjunction with the calculated location(s) and/or range(s) of object(s) as will be explained below.

In some embodiments, light having wavelengths within an atmospheric absorption band can be used. Careful selection of projector wavelength can permit light projectors 28L and 28R to compete less with solar energy. There are, however, certain wavelengths where the atmospheric absorption is so great that both projector energy and solar energy are attenuated equally. Light is broadband as emitted from the sun with a maximum intensity falling in the visible light spectrum. Sunlight having wavelengths within the infrared spectrum is of lower intensity than the visible band. And so, projected light having such wavelengths need not compete with the sunlight. Using light having such wavelengths can thereby permit reduced power levels in projecting pulses of linearly-patterned light. Atmospheric absorption bands may further reduce solar infrared illumination. For example, atmospheric absorption bands include infrared wavelengths of between about 1.35-1.4, 1.8-1.95, 2.5-2.9, and 5.5-7.2 microns.

The pulses of linearly-patterned light that are projected by light projectors 28L and 28R can be identified in images formed by cameras 30L and 30R. Using knowledge of the location from which the pulses were projected (e.g., the location of light projectors 28L and 28R), the location of the cameras 30L and 30R and the location within the images (e.g., pixel coordinates) where the feature is imaged can permit location determination using triangulation. For example, light projector 28L can be located at a location on wing 20L of taxiing aircraft 12 that is remote from a location where camera 30L is located. A location of the imaged feature can be used to determine trajectory and/or range data (e.g., distance) to the object(s) from which that specific feature is reflected.

Light projector 28L, for example, can emit a linearly-patterned beam of light to produce a pattern that, when reflected from a reference plane having a normal direction in the plane that contains both the optical axis of camera 30L and the nominal direction of projected light for light projector 28L, is focused upon a first row or column of light-sensitive pixels by camera 30L. One linearly-patterned beam might be projected, at a first projection time, at an angle of elevation of zero degrees (i.e., directed parallel to the horizon). A second structured beam might be projected, at a second projection time, at an angle of negative five degrees from the horizon (i.e., directed at a slightly downward angle about the rotational axis of light projector 28L). When the second structured beam is projected, camera 30L is configured to focus a reflected portion of the projected beam upon a second row or column of light sensitive pixels. In this way, light projector 28L and camera 30L are synchronized so that camera 30L is focusing a portion of linearly-patterned beam upon the sensing row or column when light projector 28L is projecting the linearly-patterned beam at an elevation or azimuth corresponding to the sensing row or column.

Each of these temporally spaced, projected linearly-patterned beams of light, when reflected from an object, will be focused upon a different row or column of light-sensitive pixels (e.g., different rows or columns will have a different vertical or horizontal pixel coordinates, respectively) of cameras 30L and 30R. Knowing the locations of light projectors 28L and 28R, the locations of cameras 30L and 30R, the specific feature of the projected pulses of linearly-patterned light (e.g., which specific dash of an encoded pattern), and the location within the camera image where the specific feature is imaged can permit a determination of the range of the object from which the specific feature has been reflected.

Using the calculated range information, pilots of taxiing aircraft 12 can be informed of any potential collision hazards within the scene illuminated by light projectors 28L and 28R. Pilots of taxiing aircraft 12 can steer aircraft 12 to avoid wingtip collisions and/or engine collisions based on the trajectory and/or range information that is calculated by the aircraft collision alerting system.

Figure 2A:
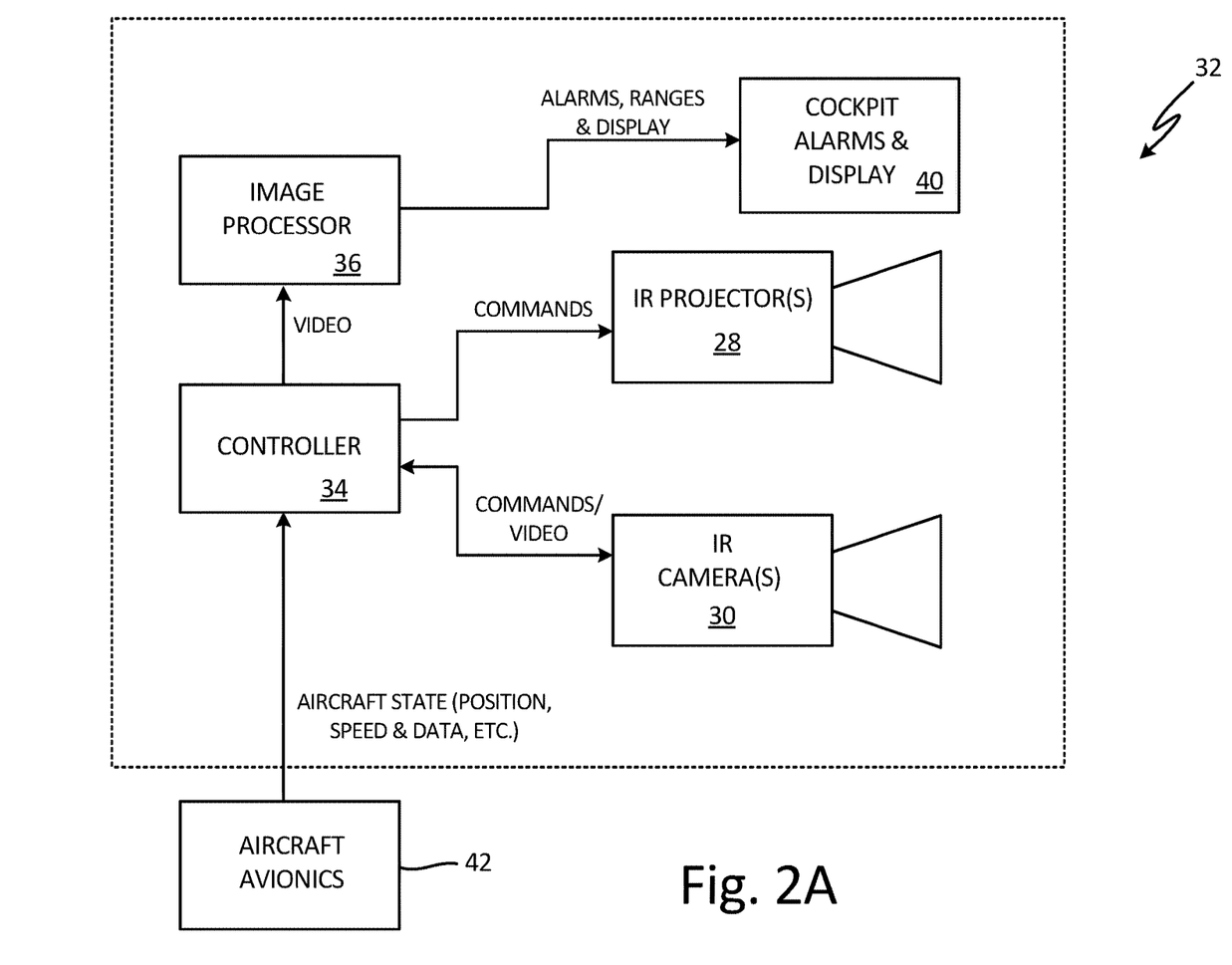
FIG. 2A is a block diagram of an exemplary aircraft collision alerting system.

FIG. 2A is a block diagram of an exemplary aircraft collision alerting system. In FIG. 2A, aircraft collision alerting system 32 includes infrared light projector(s) 28, camera(s) 30, controller 34, image processor 36, and cockpit alarm and display module 40. Infrared light projector(s) 28 is configured to be mounted at a projector location on an aircraft. Infrared light projector(s) 28 is further configured to project linearly-patterned light from infrared light projector(s) 28 onto a scene external to the aircraft, thereby illuminating a linearly-patterned portion of the scene.

Camera(s) 30 is configured to be mounted at one or more camera locations on the aircraft. Camera(s) 30 is further configured to receive light reflected from the scene. Camera(s) 30 is further configured to focus the received light onto a focal plane array comprising a plurality of light-sensitive pixels, thereby forming an image of the scene. The image can include pixel data generated by the plurality of light-sensitive pixels. In the depicted embodiment camera(s) 30 generates an image and a standard-contrast image.

Controller 34 receives inputs from camera(s) 30 and from aircraft avionics 42. Controller 34 may be a digital processor that generates commands that control the operation of infrared light projector(s) 28 and camera(s) 30. Controller 34 is configured to coordinate infrared light projector(s) 28 and camera(s) 30, so as to control a direction of the projected pulses of linearly-patterned light in a direction that is simultaneously imaged by a selected row or column of light-sensitive pixels of the focal plane array of camera(s) 30.

Image processor 36 outputs alarms, calculated ranges of object(s), and images to cockpit alarms and display module 40. Image processor 36 is configured to identify pixel coordinates corresponding to a subset of the plurality of light-sensitive pixels upon which the linearly-patterned light projected by infrared light projector(s) 28 and reflected from the linearly-patterned portion of the scene is focused. Image processor 36 is further configured to use triangulation, based on the projector location of infrared light projector(s) 28, the location(s) of camera(s) 30 and the identified pixel coordinates corresponding to pixels receiving light intensities, to calculate range value data of object(s) in the scene from which the linearly-patterned light projected by infrared light projector(s) 28 is reflected.

Figure 2B:
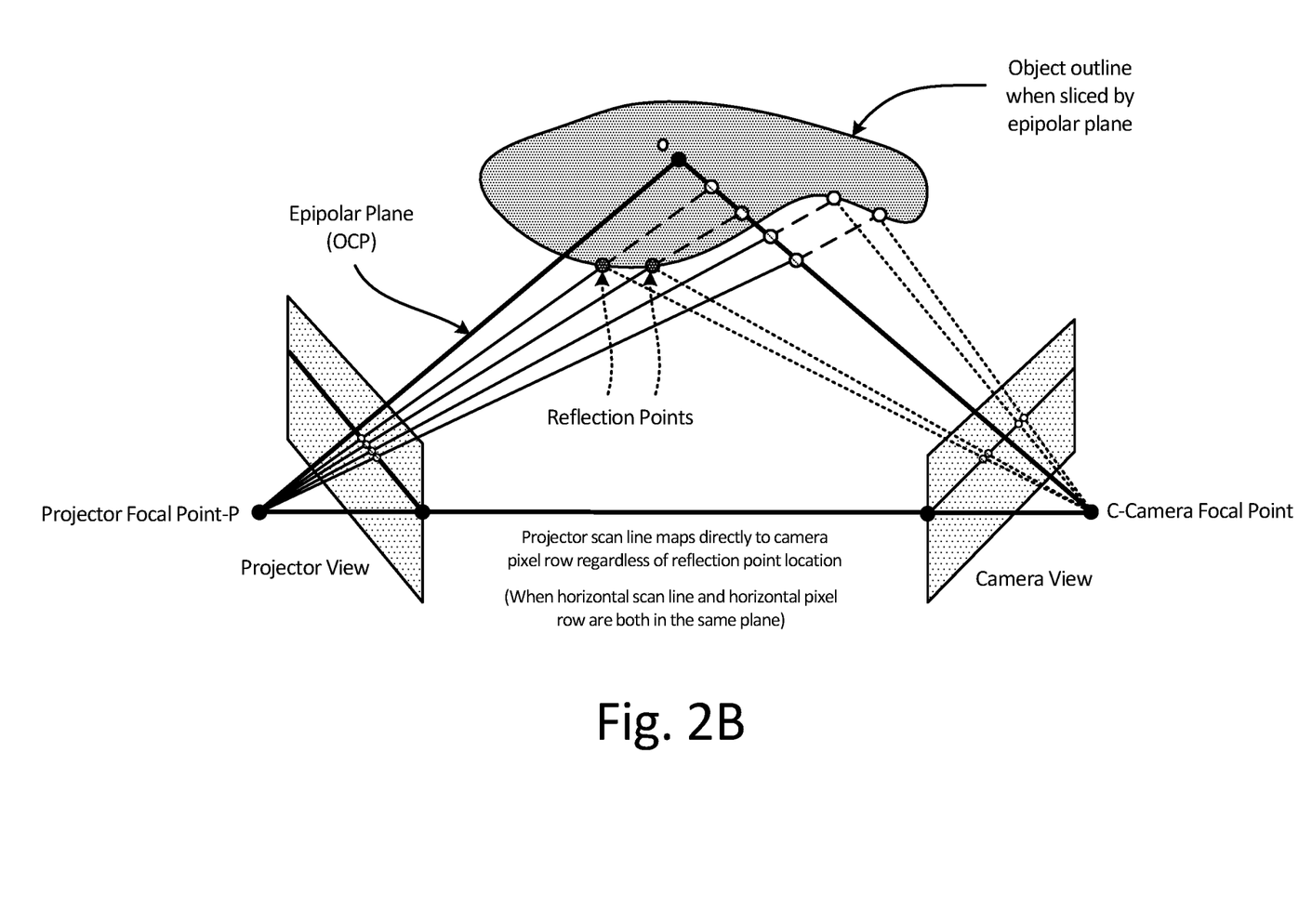
FIG. 2B is a schematic diagram of the epipolar configuration of an object, a light projector and a camera.

FIG. 2B is a schematic diagram of the epipolar configuration of an object, a light projector and a camera. In FIG. 2B, light projector 28 projects a linearly-patterned beam upon a surface of an object, thereby forming an illuminated line thereon. The linearly-projected beam is reflected by the object and imaged by camera 30. Camera 30 is configured to capture the reflected linearly-patterned beam by obtaining the pixel data from a row or column that is geometrically aligned to the reflected linearly-patterned beam. An epipolar plane is defined so as to include the illuminated line, light projector 28 and the sensing row or column of camera 30. The system coordinates the sensing row and/or column with an azimuth and/or elevation of the linearly-patterned beam projected by light projector 28.

Figure 3:
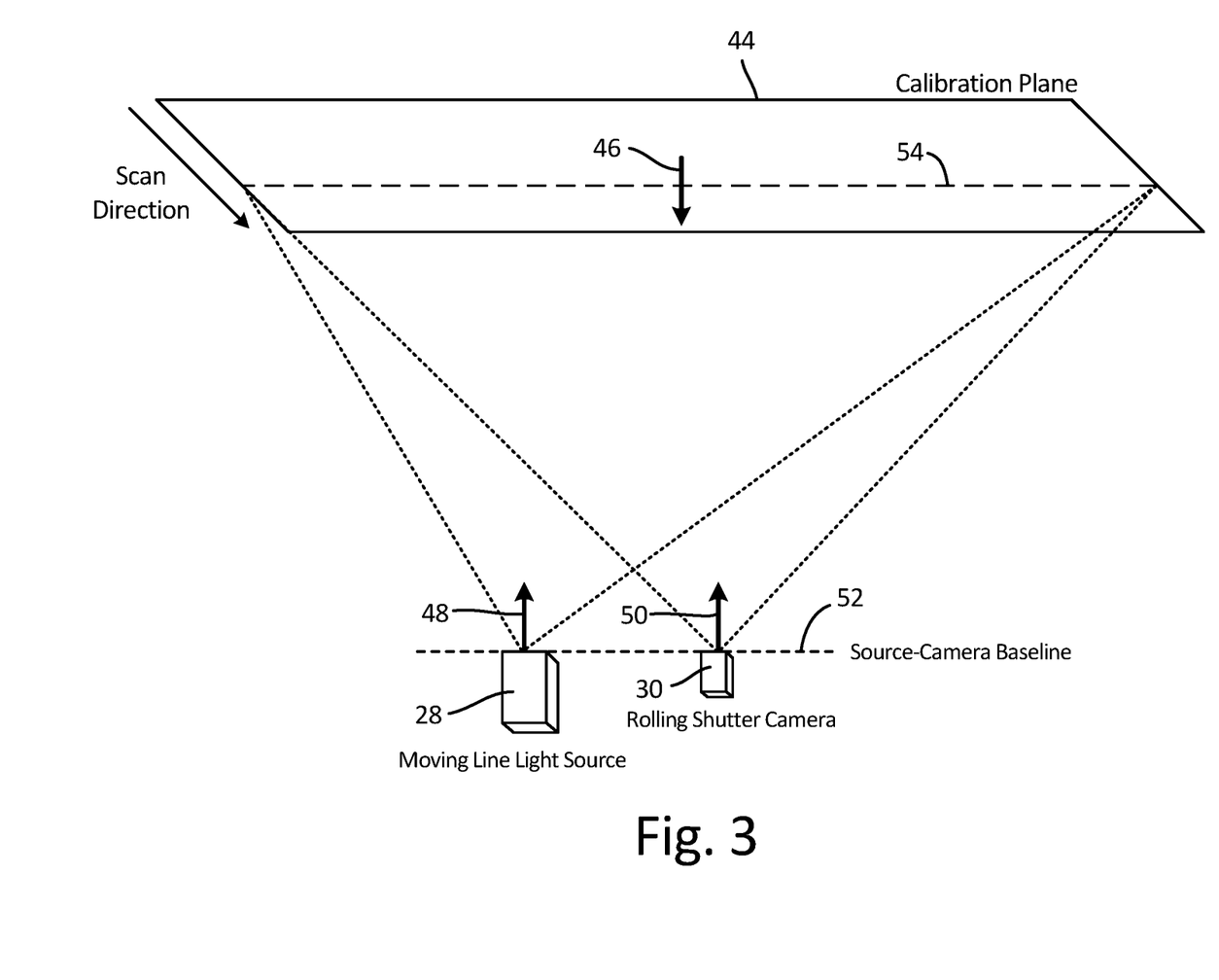
FIG. 3 is a schematic diagram of a light projector projecting a pulse of linearly-patterned light upon a reference plane.

FIG. 3 is a schematic diagram of a light projector projecting a pulse of linearly-patterned light upon a reference plane. In FIG. 3, light projector 28 is shown projecting a pulse of linearly-patterned light upon reference plane 44. Reference plane 44 is aligned such that normal vector 46 of reference plane 44 is parallel (e.g., or anti-parallel) to nominal direction vector 48 of light projector 28 and optical axis 50 of rolling shutter camera 30. Rolling shutter camera 30 and light projector 28 are aligned on source-camera baseline 52. The projected pulse of linearly-patterned light appears as reflected line 54 on reference plane 44. Rolling shutter camera 30 is synchronized with light projector 28 such that reflected line 54 is imaged by a selected row or column of light-sensitive pixels of a focal plane array of rolling shutter camera 30. Light projector 28 and rolling shutter camera 30 can be coordinated so as to sequentially capture row and or column image data for a sequence of projected pulses of linearly-patterned light scanned in a manner so as to generate two-dimensional image data.

Figure 4A:
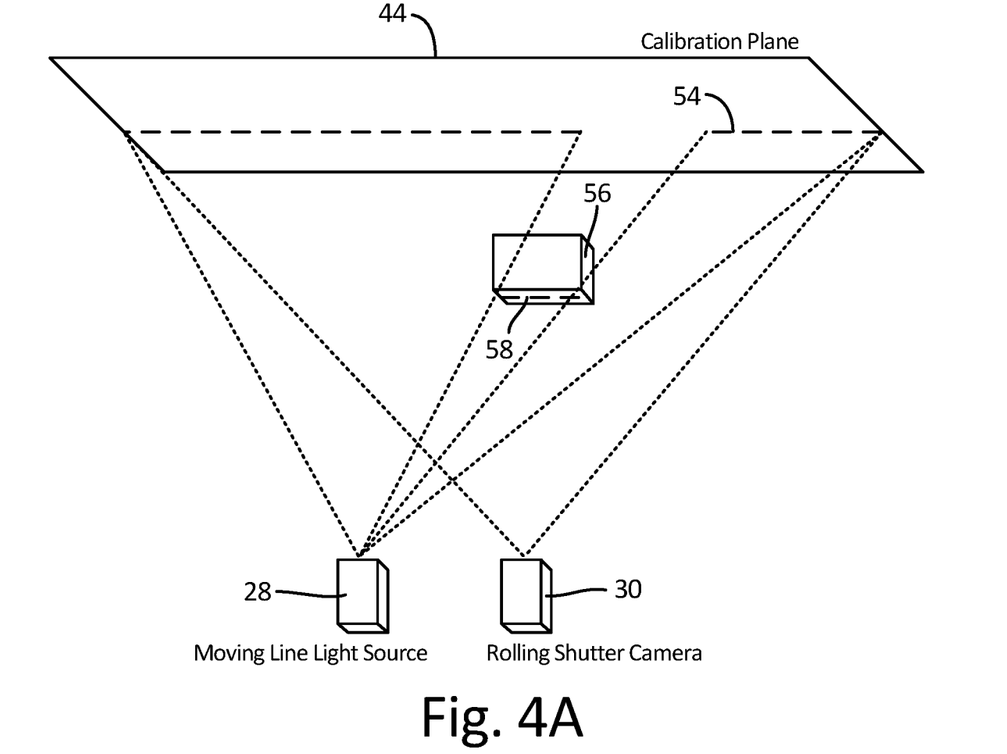
FIGS. 4A and 4B are a schematic diagram depicting a camera selectively capturing a row of image data, and the image data so captured, respectively.

FIG. 4 is a schematic diagram depicting a camera selectively capturing a row of image data. In FIG. 4, light projector 28 is shown projecting a pulse of linearly-patterned light upon reference plane 44 and on object 56 between reference plane 44 and light projector 28. The projected pulse of linearly-patterned light appears as reflected line 54 on reference plane 44 and as reflected line 58 on object 56. Rolling shutter camera 30 is synchronized with light projector 28 such that reflected lines 54 and 58 are imaged by a single selected row or column of light-sensitive pixels of a focal plane array of rolling shutter camera 30.

Figure 4B:
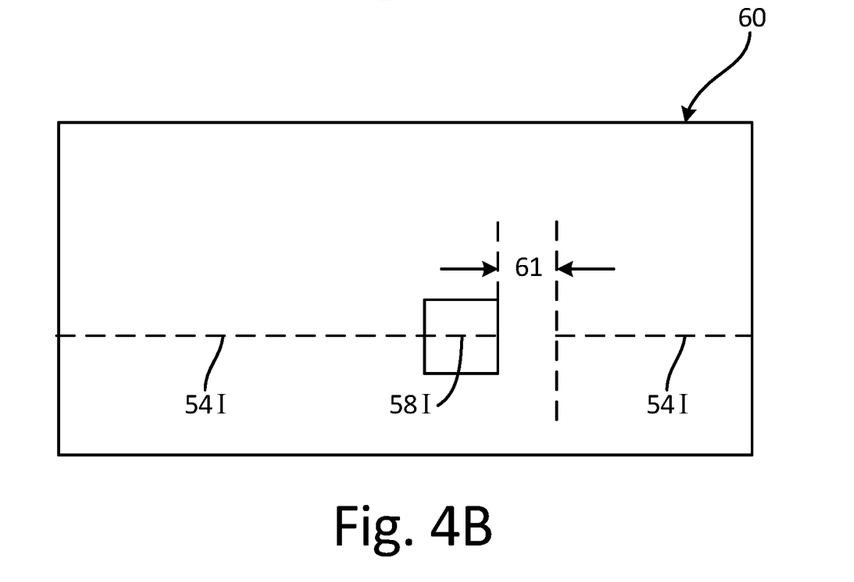

In FIG. 4B, two-dimensional image 60 of reference plane 44 includes image data 54I and 58I from a selected one of the rows or columns of light-sensitive pixels upon which reflected lines 54 and 58 are focused. Because of the specific configuration of light projector 28, rolling shutter camera 30, reference plane 44 and object 56, image data 54I and 58I include a gap in the imaged line. A gap dimension 61 is indicative of the location(s) and/or range(s) of reference plane 44 and object 56. If, for example, reference plane 44 were located at an infinite distance from light projector 28 and rolling shutter camera 30, then gap dimension 61 would be incapable of providing a location and/or range of object 58 alone. To facilitate calculation of location(s) and/or range(s) of object(s), without employing a reflective reference plane, the pulses of linearly-patterned light can be encoded using, for example, spatially patterned sequences of intensity variation.

Figure 5A:
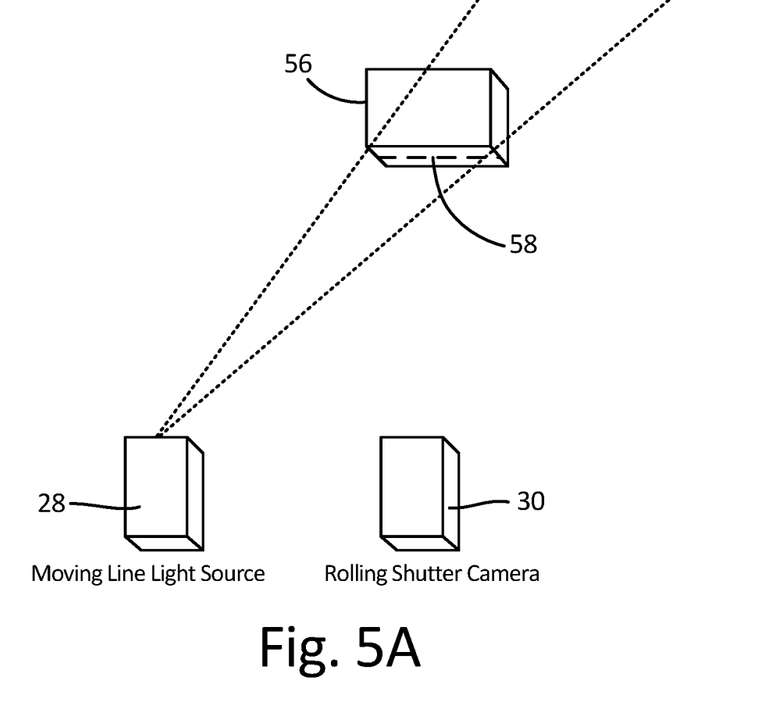
FIGS. 5A and 5B are a schematic diagram depicting light projector projecting a pulse of linearly-patterned light with a dashed encoding pattern, and the image data containing such linear-pattern light, respectively.
Figure 5B:
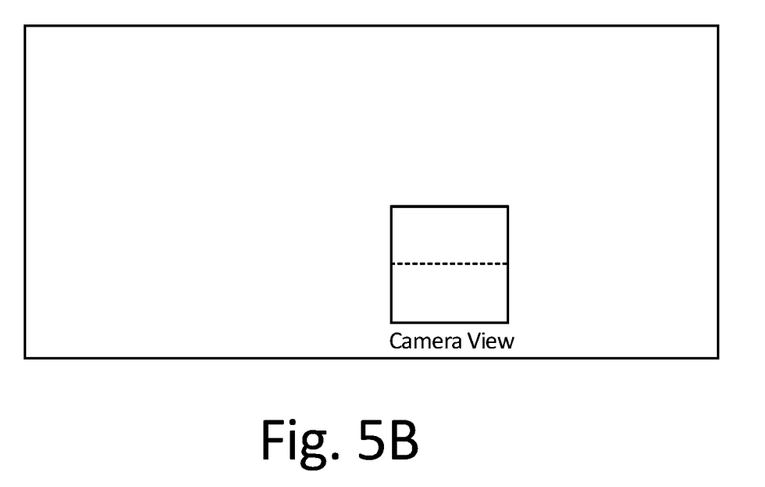

FIGS. 5A and 5B are a schematic diagram depicting light projector 28 projecting a pulse of linearly-patterned light with a dashed encoding pattern, and the image data containing such linear-pattern light, respectively. In FIG. 5A, light projector 28 is shown projecting a pulse of linearly-patterned light upon object 56. In the depicted scenario, no reference plane is present. A portion of the projected pulse of linearly-patterned light is reflected by object 54 as indicated in reflected line 58. Reflected line 58 reveals a spatially encoded pattern of intensity. The encoding facilitates identification of a relative direction (e.g., an azimuthal and/or elevation angle) of the linearly-patterned light within the projected light pulse as projected from light projector 28. In some embodiments, for example, dash lengths may monotonically increase from a minimum azimuthal direction to a maximum azimuthal direction. Thus, the imaged dash length may be indicative of the azimuthal direction associated with a particular dash segment. FIG. 5B shows the image data captured by rolling shutter camera 30.

Figure 6A:
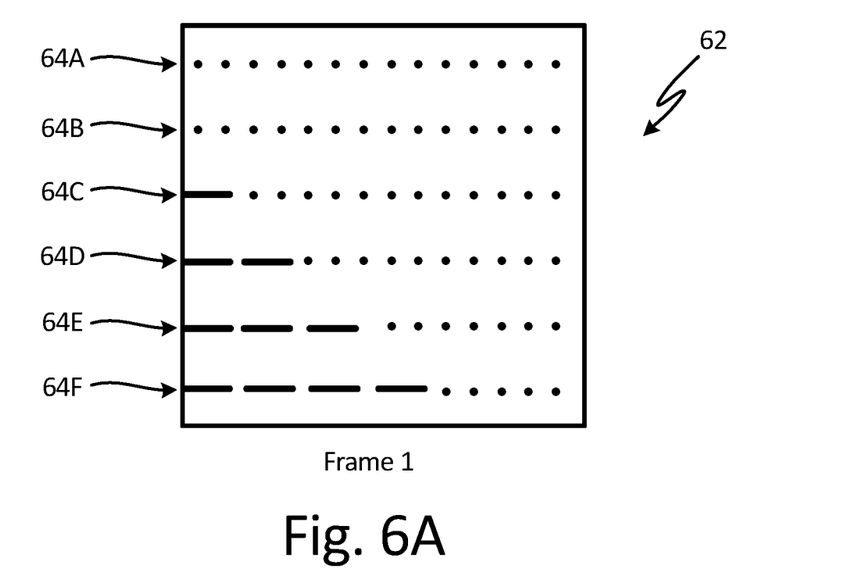
FIGS. 6A and 6B depict two frames from a sequence of selectively captured images depicting a sequence of encoded patterns projected from a light projector.
Figure 6B:
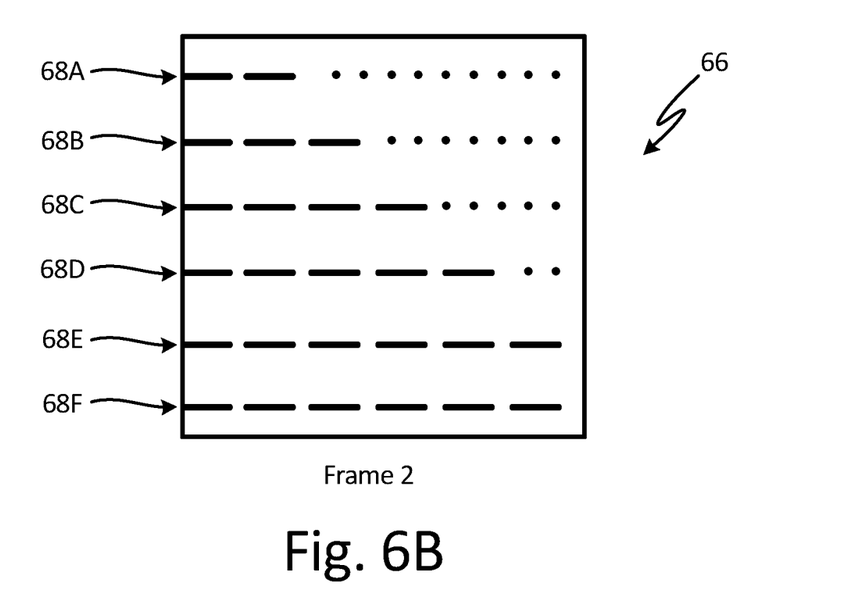

FIGS. 6A and 6B depict two frames from a sequence of selectively captured images depicting a sequence of encoded patterns projected from a light projector. In FIG. 6A, first two-dimensional image 62 is shown. First two-dimensional image 62 was obtained from a sequence of row images obtained. Each row image corresponds to a different elevation direction at which different pulses of linearly-patterned light have been directed and synchronously imaged. Two-dimensional image 62 includes rows 64A-64F of image data upon which reflections of pulses of linearly-patterned light have been focused. Each of rows 64A-64F of image data depicts a row image that is encoded with a different spatial pattern of light intensity encodings. Although rows 64A-64B of image data show encodings that are regular throughout, rows 64C-64F of image data provide encodings that have dash length variations. Such a sequence of encodings can facilitate the calculation of location(s) and/or range(s) of object(s) imaged.

In FIG. 6B, second two-dimensional image 66 is shown. Second two-dimensional image 66 was again obtained from a sequence of row images obtained. The sequence of the encodings are different, however, than those depicted in FIG. 6A. Each row image corresponds to a different elevation direction at which different pulses of linearly-patterned light have been directed and synchronously imaged. Two-dimensional image 66 includes rows 68A-68F of image data upon which reflections of pulses of linearly-patterned light have been focused. Each of rows 68A-68F of image data depicts a row image that is encoded with a different spatial pattern of light intensity encodings. Although rows 68E-68F of image data show encodings that are regular throughout, rows 64A-64E of image data provide encodings that have dash length variations. Thus, by varying the sequence of encoding, different row images can be used to provide data for use in calculating location(s) and/or range(s) of object(s) imaged. Thus, location(s) and/or range(s) of various portions of object(s) can be calculated, using such techniques.

Other encoding techniques can be used to facilitate the calculation of location(s) and/or range(s) of object(s) imaged. For example, a binary-coded sequence of linearly-patterned pulsed can be sequentially projected upon an object. A solid line, for example, can be projected upon the object. Then a dash that spans a first half of the line can be projected upon the object. Then a line having dashes in the first and third quarter of the line can be projected upon the object. Then a dashed line having dashes in the first third, fifth, and seventh eighths of the line can be projected upon the object. Such binary encoding can continue until a predetermined precision of range calculation is obtained. In other embodiments, a pseudo-random sequence of dashes can be projected. Image processor 36 can compare the captured row image with the pseudo-random sequence to calculate location(s) and/or range(s) of objects in the row image. In some embodiments, image processor 36 may identify locations that require further precision and send a signal to controller 34, the signal indicative of such regions. The controller can then direct light projector 28 to project pulsed of linearly-patterned light in the directions corresponding to the signal.

The following are non-exclusive descriptions of possible embodiments of the present invention.

Apparatus and associated methods relate to a system for calculating location(s) and/or range(s) of object(s) in a scene external to an aircraft. The system includes a light projector configured to be mounted at a projector location on the aircraft and to project pulses of linearly-patterned light in a controllable direction onto the scene external to the aircraft. The system includes a camera having a two dimensional array of light-sensitive pixels arranged in rows and columns of the light-sensitive pixels. The camera is configured to be mounted at a camera location on the aircraft and to selectively capture a row or column of image data from a selected one of the rows or columns of light-sensitive pixels. The system includes a controller configured to coordinate the light projector and the camera by controlling the controllable direction of the projected pulses of linearly-patterned light so that a portion of the projected pulses of linearly-patterned light reflected by the scene external to the aircraft is received by the camera and focused on the selected one of the rows or columns of light-sensitive pixels. The system also includes an image processor configured to calculate, based on the projector location, the camera location, and the selectively captured row or column of image data, locations(s) and/or range(s) of object(s) in the scene from which the linearly-patterned light projected by the light projector is reflected.

The system of the preceding paragraph can optionally include, additionally and/or alternatively, any one or more of the following features, configurations and/or additional components:

A further embodiment of the foregoing system, wherein the projector location is on a line along which one of the rows or columns of light-sensitive pixels is located.

A further embodiment of any of the foregoing systems, wherein the controllable direction is an angular direction, and wherein the line along which one of the rows or columns of light-sensitive pixels is located defines an angular control axis about which the angular direction of project pulses of linearly-patterned light is controlled.

A further embodiment of any of the foregoing systems, wherein the camera can be configured to form a first image while the light projector is projecting a pulse of linearly-patterned light onto the scene.

A further embodiment of any of the foregoing systems, wherein the camera can be configured to form a second image while the light projector is not projecting a pulse of linearly-patterned light onto the scene.

A further embodiment of any of the foregoing systems, wherein the image processor can be configured to generate a difference image based on a difference between the first and second images.

A further embodiment of any of the foregoing systems, wherein the linearly-patterned light can include a solid-line pattern.

A further embodiment of any of the foregoing systems, wherein the linearly-patterned light can include a dashed-line pattern having a binary-weighted spatial frequency.

A further embodiment of any of the foregoing systems, wherein the linearly-patterned light can include a dashed-line pattern having a pseudo-randomly varying spatial frequency.

A further embodiment of any of the foregoing systems, wherein the linearly-patterned light projected by the light projector can include infrared light and the camera is an infrared camera and each of the plurality of light-sensitive pixels is sensitive to infrared light.

A further embodiment of any of the foregoing systems, wherein the linearly-patterned light projected by the light projector comprises infrared light having a wavelength corresponding to a lower solar intensity portion or to an atmospheric absorption band.

A further embodiment of any of the foregoing systems can further include a cockpit notification system configured to generate an alert signal if the calculated location(s) and/or range(s) of object(s) indicate that the object(s) are within a collision zone or on a collision trajectory.

A further embodiment of any of the foregoing systems, wherein the cockpit notification system can include an audible alarm that is activated when the calculated location(s) and/or range(s) of the object(s) indicates one or more of the object(s) in the scene has a combination of location(s) and/or ranges(s) relative to the aircraft corresponding to a risk of collision.

A further embodiment of any of the foregoing systems, wherein the cockpit notification system includes a display device configured to display a two-dimensional image of the scene annotated with the calculated location(s) and/or range(s) of object(s).

Some embodiments relate to a method for calculating location(s) and/or range(s) of object(s) in a scene external to an aircraft. The method includes projecting, from a light projector configured to be mounted at a projector location on the aircraft, pulses of linearly-patterned light in a controllable direction onto the scene external to the aircraft. The method includes selectively capturing, from a camera having a two dimensional array of light-sensitive pixels arranged in rows and columns of the light-sensitive pixels, a row or column of image data from a selected one of the rows or columns of light-sensitive pixels. The camera is configured to be mounted at a camera location on the aircraft. The method includes controlling the controllable direction of the projected pulses of linearly-patterned light so that a portion of the projected pulses of linearly-patterned light reflected by the scene external to the aircraft is received by the camera and focused on the selected one of the rows or columns of light-sensitive pixels. The method includes calculating, based on the projector location, the camera location, and the selectively captured row or column of image data, locations(s) and/or range(s) of object(s) in the scene from which the linearly-patterned light projected by the light projector is reflected. The method also includes outputting an alert signal if the calculated location(s) and/or range(s) of object(s) indicates one or more of the object(s) in the scene has a combination of a location(s) and/or range(s) relative to the aircraft corresponding to a risk of collision.

The method of the preceding paragraph can optionally include, additionally and/or alternatively, any one or more of the following features, configurations and/or additional components:

A further embodiment of the foregoing method, wherein the projector location is on a line along which one of the rows or columns of light-sensitive pixels is located.

A further embodiment of any of the foregoing methods, wherein controlling the controllable direction includes angularly directing the projected pulse of linearly-patterned light about the line along which one of the rows or columns of light-sensitive pixels is located defines an angular control axis about which the angular direction of project pulses of linearly-patterned light is controlled.

A further embodiment of any of the foregoing methods, wherein projecting pulses of linearly-patterned light includes projecting pulses of light having a dashed-line pattern of a binary-weighted spatial frequency.

A further embodiment of any of the foregoing methods, wherein outputting an alert signal includes activating an audible alarm that when the calculated location(s) and/or range(s) of the object(s) indicates one or more of the object(s) in the scene has a combination of location(s) and/or ranges(s) relative to the aircraft corresponding to a risk of collision.

A further embodiment of any of the foregoing methods can further include displaying a two-dimensional image of the scene annotated with the calculated location(s) and/or range(s) of object(s).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for calculating location(s) and/or range(s) of object(s) in a scene external to an aircraft, the system comprising:
   a light projector configured to be mounted at a projector location on the aircraft and to project pulses of linearly-patterned light in a controllable direction onto the scene external to the aircraft;
   a camera having a two dimensional array of light-sensitive pixels arranged in rows and columns, the camera configured to be mounted at a camera location on the aircraft and aligned such that the projected pulses of linearly patterned light reflected by the scene external to the aircraft are imaged by a selected one of the rows or columns that is geometrically aligned to the projected pulse of linearly-patterned light;
   a controller configured to coordinate the light projector and the camera by synchronizing the controllable direction of the projected pulses of linearly-patterned light with the selected one of the rows or columns that images the projected pulses of linearly-patterned light reflected by the scene external to the aircraft; and
   an image processor configured to calculate, based on the projector location, the camera location, and the image captured by the selected one of the rows or columns, locations(s) and/or range(s) of object(s) in the scene from which the pulses of linearly-patterned light projected by the light projector are reflected.

2. The system of claim 1, wherein the projector location is on a line along which one of the rows or columns of light-sensitive pixels is located.

3. The system of claim 2, wherein the controllable direction is an angular direction, wherein the line along which one of the rows or columns of light-sensitive pixels is located defines an angular control axis about which the angular direction of project pulses of linearly-patterned light is controlled.

4. The system of claim 1, wherein the camera is configured to form a first image while the light projector is projecting a pulse of linearly-patterned light onto the scene.

5. The system of claim 4, wherein the camera is configured to form a second image while the light projector is not projecting a pulse of linearly-patterned light onto the scene.

6. The system of claim 5, wherein the image processor is configured to generate a difference image based on a difference between the first and second images.

7. The system of claim 1, wherein the linearly-patterned light comprises a solid-line pattern.

8. The system of claim 1, wherein the linearly-patterned light comprises a dashed-line pattern having a binary-weighted spatial frequency.

9. The system of claim 1, wherein the linearly-patterned light comprises a dashed-line pattern having a pseudo-randomly varying spatial frequency.

10. The system of claim 1, wherein the linearly-patterned light projected by the light projector comprises infrared light and the camera is an infrared camera and each of the plurality of light-sensitive pixels is sensitive to infrared light.

11. The system of claim 10, wherein the linearly-patterned light projected by the light projector comprises infrared light having a wavelength corresponding to a lower solar intensity portion or to an atmospheric absorption band.

12. The system of claim 1, further comprising a cockpit notification system configured to generate an alert signal if the calculated location(s) and/or range(s) of object(s) indicate that the object(s) are within a collision zone or on a collision trajectory.

13. The system of claim 12, wherein the cockpit notification system includes an audible alarm that is activated when the calculated location(s) and/or range(s) of the object(s) indicates one or more of the object(s) in the scene has a combination of location(s) and/or ranges(s) relative to the aircraft corresponding to a risk of collision.

14. The system of claim 12, wherein the cockpit notification system includes a display device configured to display a two-dimensional image of the scene annotated with the calculated location(s) and/or range(s) of object(s).

15. A method for calculating location(s) and/or range(s) of object(s) in a scene external to an aircraft, the method comprising:
   projecting, from a light projector configured to be mounted at a projector location on the aircraft, pulses of linearly-patterned light in a controllable direction onto the scene external to the aircraft;
   imaging, by a selected one of rows or columns of light-sensitive pixels of a camera, the projected pulses of linearly patterned light reflected by the scene external to the aircraft, wherein the camera is configured to be mounted at a camera location on the aircraft and aligned with the light projector;
   synchronizing the controllable direction of the projected pulses of linearly-patterned light with the selected one of the rows or columns that images the projected pulses of linearly-patterned light reflected by the scene external to the aircraft;
   calculating, based on the projector location, the camera location, and the image captured by the selected one of the rows or columns, locations(s) and/or range(s) of object(s) in the scene from which the linearly-patterned light projected by the light projector is reflected; and
   outputting an alert signal if the calculated location(s) and/or range(s) of object(s) indicates one or more of the object(s) in the scene has a combination of a location(s) and/or range(s) relative to the aircraft corresponding to a risk of collision.

16. The method of claim 15, wherein the projector location is on a line along which one of the rows or columns of light-sensitive pixels is located.

17. The method of claim 16, wherein controlling the controllable direction comprises:
angularly directing the projected pulse of linearly-patterned light about the line along which one of the rows or columns of light-sensitive pixels is located defines an angular control axis about which the angular direction of project pulses of linearly-patterned light is controlled.

18. The method of claim 15, wherein projecting pulses of linearly-patterned light comprises:
projecting pulses of light having a dashed-line pattern of a binary-weighted spatial frequency.

19. The method of claim 15, wherein outputting an alert signal comprises:
activating an audible alarm that when the calculated location(s) and/or range(s) of the object(s) indicates one or more of the object(s) in the scene has a combination of location(s) and/or ranges(s) relative to the aircraft corresponding to a risk of collision.

20. The method of claim 15, further comprising:
displaying a two-dimensional image of the scene annotated with the calculated location(s) and/or range(s) of object(s).

* * * * *